(12) United States Patent
Boutnaru

(10) Patent No.: US 10,671,724 B2
(45) Date of Patent: Jun. 2, 2020

(54) TECHNIQUES FOR DETECTING ENCRYPTION

(71) Applicant: PAYPAL, INC., San Jose, CA (US)

(72) Inventor: Shlomi Boutnaru, Modiin (IL)

(73) Assignee: PAYPAL, INC., San Jose, CA (US)

( * ) Notice: Subject to any disclaimer, the term of this patent is extended or adjusted under 35 U.S.C. 154(b) by 391 days.

(21) Appl. No.: 15/285,313

(22) Filed: Oct. 4, 2016

(65) Prior Publication Data

US 2018/0075234 A1    Mar. 15, 2018

Related U.S. Application Data

(63) Continuation-in-part of application No. 15/266,974, filed on Sep. 15, 2016.

(51) Int. Cl.
*G06F 21/55* (2013.01)
*G06F 21/56* (2013.01)
*H04L 29/06* (2006.01)

(52) U.S. Cl.
CPC .......... *G06F 21/554* (2013.01); *G06F 21/566* (2013.01); *G06F 2221/034* (2013.01); *H04L 63/1441* (2013.01)

(58) Field of Classification Search
CPC ................. G06F 21/554; G06F 21/566; G06F 2221/034; H04L 63/1441
See application file for complete search history.

(56) References Cited

U.S. PATENT DOCUMENTS 9,990,511 B1 *   6/2018  Dreyfus .............. G06F 21/6218
10,007,795 B1 *  6/2018  Chung ................. G06F 21/568
(Continued)

FOREIGN PATENT DOCUMENTS

WO    WO 2018065750    4/2018

OTHER PUBLICATIONS

Fazlali, Mahmood et al, "An Efficient Algorithm for Detecting Metamorphic Malware by Using Opcode Frequency Rate and Decision Tree", Jul. 2016, Intl Journal of Information Security and Privacy, https://www.researchgate.net/publication/305628618_Metamorphic_malware_detection_using_opcode_fr (Year: 2016).*

(Continued)

*Primary Examiner* — Linglan E Edwards
*Assistant Examiner* — Forrest L Carey
(74) *Attorney, Agent, or Firm* — Haynes and Boone, LLP

(57) ABSTRACT

Encryption operations may be performed by a computer system for various reasons. It is often unclear, however, whether one of the many processes executing on a system is performing encryption. Encryption can be computationally expensive, and a process that engages in a large amount of encryption may represent a performance bottleneck for the system, limiting the ability of the system to do additional work (or weakening it to a Denial of Service attack). Further, while encryption is used in many legitimate contexts, it is also used by malware in certain scenarios to communicate with a remote attacker (e.g. command and control software) or used as part of ransomware. Thus, detecting whether a process is performing encryption can be important to identifying a performance bottleneck or uncovering malware. By monitoring a process and examining certain aspects of its activity, however, encryption operations can be detected and further remedial actions can be taken if needed.

18 Claims, 10 Drawing Sheets

(56) References Cited

U.S. PATENT DOCUMENTS

| | | | | |
|---|---|---|---|---|
| 2005/0288939 | A1* | 12/2005 | Peled | G06F 21/10 |
| | | | | 709/229 |
| 2011/0219451 | A1* | 9/2011 | McDougal | G06F 21/562 |
| | | | | 726/23 |
| 2017/0032123 | A1* | 2/2017 | Carson | G06F 21/567 |
| 2017/0223031 | A1* | 8/2017 | Gu | G06F 3/0623 |
| 2017/0324755 | A1* | 11/2017 | Dekel | H04L 63/145 |
| 2018/0018458 | A1* | 1/2018 | Schmugar | G06F 21/566 |
| 2018/0054480 | A1* | 2/2018 | Bailey | H04L 63/0428 |

OTHER PUBLICATIONS

Friedman, Mark, et al. "File Cache Performance and Tuning" [Online]. Windowns 2000 Performace Guide [retrieved on Aug. 15, 2016]. Retrieved from the Internet: <URL: https://msdn.microsoft.com/enus/library/bb742613(d=printer).aspx>, Jan. 2002.

Evans, Chris "Write-through, write-around, write-back:Cache explained" [Online] [retrieved on Aug. 15, 2016]. Retrieved from the Internet: <URL: http://www.computerweekly.com/feature/WritethroughwritearoundwritebackCacheexplained>.

Unknown "Detecting encryption in real-time?" [Online]. Cryptography Stack Exchange [retrieved on Aug. 10, 2016]. Retrieved from the Internet: <URL: http://crypto.stackexchange.com/questions/34045/detectingencryptioninrealtime>.

Unknown "How to Determine if Netbackup client is performing encrypted backups after setting the Encryption attribute in NetBackup policies" [Online] [retrieved on Sep. 13, 2016]. Retrieved from the Internet: <URL: https://www.veritas.com/support/en_US/article.000011599>, Sep. 14, 2015.

Shabtai, Asaf "Detecting unknown malicious code by applying classification techniques on OpCode patterns" [Online] Security Informatics, 1:1 [retrieved on Sep. 21, 2016]. Retrieved from the Internet: <URL: https://security-informatics.springeropen.com/articles/10.1186/2190-8532-1-1>, 2012.

Malhotra, Paras "Detection of encrypted streams for egress monitoring" [Online]. Retrospective Theses and Dissertations [retrieved on Sep. 21, 2016]. Retrieved from the Internet: <URL: http://lib.dr.iastate.edu/cgi/viewcontent.cgi?article=15631&context=rtd>, Paper 14632.

Unknown "Difference between Hardware implemented algorithm and software implemented one?" [Online] Cryptography Stack Exchange [retrieved on Sep. 23, 2016] Retrieved from the Internet: <URL: http://crypto.stackexchange.com/questions/31624/differencebetweenhardwareimplementedalgorithmandsoftwareimplementedone>.

* cited by examiner

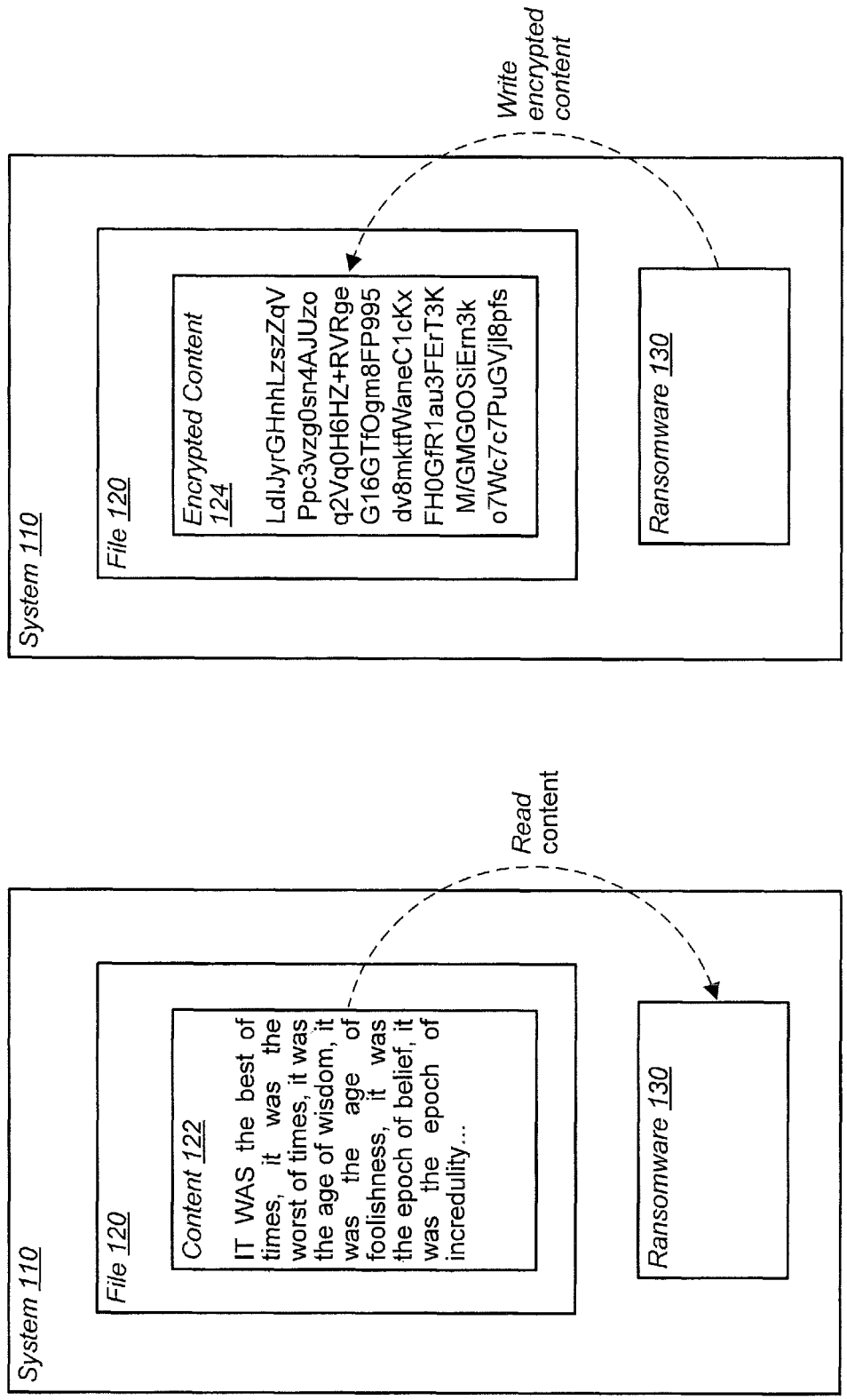

TECHNIQUES FOR DETECTING ENCRYPTION

RELATED APPLICATIONS

This application is a continuation-in-part of, and claims the benefit of U.S. application Ser. No. 15/266,974 filed on Sep. 15, 2016, and entitled "Techniques for Ransomware Detection and Mitigation", the contents of which are incorporated by reference herein in their entirety.

TECHNICAL FIELD

This disclosure relates to computer system security and performance. More particularly, portions of this disclosure relate to techniques for detecting the use of encryption operations within a computing environment, identifying performance bottlenecks related to encryption, identifying possible security breaches related to encryption, and/or mitigating such security breaches.

BRIEF DESCRIPTION OF THE DRAWINGS

FIGS. 1A and 1B are block diagrams illustrating certain aspects of a ransomware process, according to some embodiments.

DETAILED DESCRIPTION

Figure 2B:
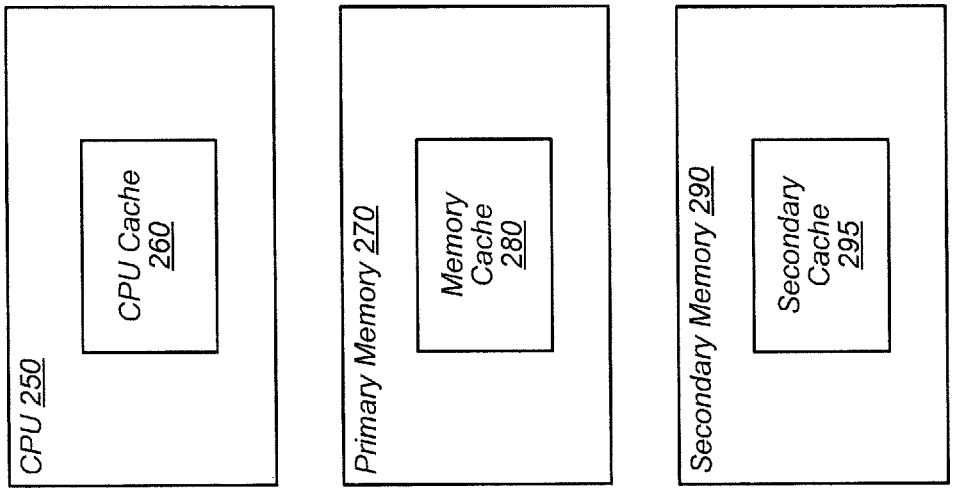
FIGS. 2A and 2B are block diagrams illustrating aspects of a cache hierarchy, according to some embodiments.

One type of malicious software (malware) that affects computers today is known as ransomware. This type of software, if given access to a computer system, may use encryption on the contents of a hard drive or other data storage device (possibly including networked files). Once encrypted, the original data may be no longer accessible. As such, a system user who lacks decryption keys will no longer be able to readily access his or her data.

Once the original data has been encrypted and the plain clear-text (non-encrypted) version is deleted, a system user may be contacted with a demand from a malicious party who has breached system security with ransomware. Frequently, the malicious party will demand that the user pay him some amount of anonymous crypto-currency (e.g., BitCoin) in order to have the user's files decrypted so that they are accessible again. If the user does not pay, then the files may remain encrypted and inaccessible.

Unless the user has a good backup system, large amounts of data may be lost. Furthermore, even if a backup system is in place, data could still be lost as files that have been encrypted by ransomware may be automatically backed up in encrypted form. Depending on data retention schemes, a backup of non-affected ("good") data could even be overwritten by ransomware-encrypted data. Thus, consumers and small businesses may be hit particularly hard by ransomware, as these entities often do not have good data backup policies. Even if backup data exists, replacing the entire contents of a hard drive or other storage device may be a slow process. For a business, replacing lost data from backup may also mean halting or reducing operations while the data is restored. Thus, unchecked ransomware has a large potential to be destructive and impact system uptime and productivity.

Detecting ransomware operations at an early stage, however, may allow its effects to be mitigated or prevented. The present disclosure discusses various techniques relating to ransomware prevention and mitigation.

In some embodiments, preventing and mitigating ransomware includes taking advantage of existing system data caches to detect possible ransomware and to take remedial actions in response. These aspects and more are discussed below.

Thus, because encryption is frequently used by ransomware to hold data hostage, detecting encryption operations by a process can help uncover instances of ransomware in operation. Detection encryption is also useful in other circumstances as well, however.

Monitoring a process to see if it is performing encryption operations can help identify performance bottlenecks in a system. If a process is using significant resources on CPU-driven encryption, for example, it could be worthwhile for an organization to add a specialized hardware encryption module to more rapidly perform hardware-supported encryption.

Encryption is also used in other malware contexts besides ransomware. In command and control scenarios, for example, a remote attacker may communicate with a host process using encryption to send commands to a compromised system. By encrypting commands (and responses), it may be harder to detect such malware.

Thus, detailed techniques for detecting whether a process is performing an encryption operation are disclosed herein. These techniques may include doing a comparison or analysis of source data and/or output data, looking at opcodes used by a process, and employing other factors as well. Remedial actions may be taken in response to detecting encryption by a process (which could indicate a performance bottleneck or malware), such as notifying a user and/or quarantining a process.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1A, a block diagram of a system is shown illustrating an aspect of ransomware operations. In this diagram, system 110 has a file 120 that includes content 122. System 110 has also been infected with ransomware 130 as shown (e.g., in this embodiment, ransomware 130 is currently executing on system 110).

Content 122 is not encrypted in this example. Instead, it includes English text. File 120 may include any type of content, however, such as audio, video, text, pictures, slideshows, etc. This content may be in a variety of different data formats.

In FIG. 1A, ransomware 130 is attempting to read content 122 from file 120. After reading the content, it can then encrypt it and delete the original version, rendering it inaccessible to a user.

Turning to FIG. 1B, another block diagram is shown of system 110. In this figure, ransomware 130 has successfully read content 122, and encrypted it. Ransomware 130 then stores the encrypted content 124 back into file 120, overwriting the original content. Note that in various embodiments, ransomware 130 may opt to create a new file instead of simply writing back to an original file.

Figure 2A:
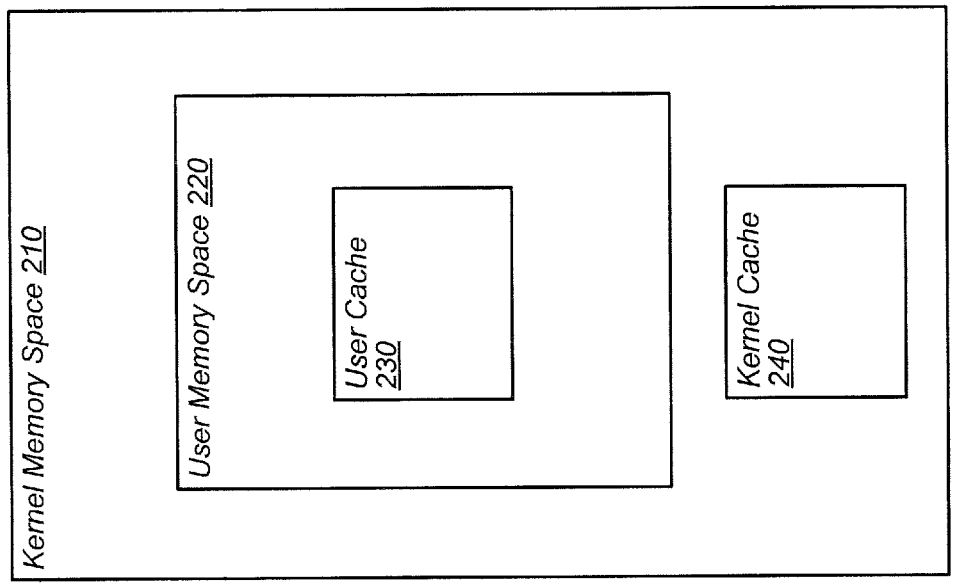

FIGS. 2A and 2B relate to a cache hierarchy that may be present in system 110 in various embodiments. As discussed further below, the particular different caches that are available in system 110 may help allow detection and mitigation of ransomware by focusing on particular data operations that are being performed via one or more caches.

FIG. 2A shows a diagram of one embodiment of kernel and user memory spaces. In this embodiment, kernel memory space 210 corresponds to one or more locations of physical and/or virtual memory. There may be one kernel memory space 210 per instance of an operating system, but kernel memory space 210 may include multiple ones of user memory space 220. (That is, an operating system instance may have multiple users, each of whom has their own respective user memory space 220).

User cache 230 and kernel cache 240 are software-implemented memory caches in the embodiment of FIG. 2A. As used herein, the term software-implemented cache indicates that these caches do not necessarily have dedicated physical memory-rather, the underlying storage space could vary and change over time. For example, user cache 230 could be 4 MB at one point, but then be increased to 8 MB by software in response to changing conditions (of course many different cache sizes are possible, and the above is just one example). Kernel cache 240 might likewise change based on different server configuration options, for example. Thus, the physical storage space used to implement user cache 230 and kernel cache 240 may vary, in the embodiment of FIG. 2A (e.g., a fixed amount of physical memory is not necessarily used).

User cache 230 corresponds to a particular user, and is implemented at the user level in the embodiment of FIG. 2A. Nonetheless, user cache 230 is not necessarily directly operated by the user—an operating system may instead establish and manage user cache 230. Multiple user caches 230 may exist corresponding at a one to one ratio to various active system users (or, a fewer number of caches may exist, in some embodiments). User actions may affect operations of user cache 230 by changing available user settings in some embodiments—for example, turning off read or write optimization, for various operating systems, may cause all or a portion of user cache 230 to be disabled. (In one embodiment, the ability of a user to disable user cache 230 is the reason that multiple cache levels are checked for ransomware activity, since malicious software may be able to inactivate some caches but not others). By checking multiple cache levels for evidence of ransomware activity, detection can be more robust.

Kernel cache 240 is a system-level cache in the embodiment of FIG. 2A. Accordingly, functionality of kernel cache 240 cannot be altered a user that does not have privileged (special) access, in various embodiments (such as superuser or root access). The ability to cause data to be stored in kernel cache 240 therefore may be unaffected by user actions, in one or more embodiments. While user cache 230 could be turned off in some instances, kernel cache 240 may remain functioning. In one embodiment, kernel cache 240 is implemented as a single system-wide cache for an operating system (but may store data for multiple users simultaneously). Kernel cache 240 may also store other system data that is not accessible by a non-privileged user.

Turning to FIG. 2B, a block diagram is shown of various hardware and corresponding caches that may be present in system 110. In this figure, CPU 250 includes a CPU cache 260. Primary memory 270 includes a memory cache 280. This primary memory may be relatively high-speed memory such as a RAM that is used for programs and data that are in active use. Secondary memory 290 includes a secondary cache 295. Secondary memory 290 includes, in various embodiments, hard disks or other relatively slower (and larger) storage devices. Thus, various hardware level caches may exist in different portions of system 110. These hardware level caches can be accessed, in various embodiments, to detect ransomware activity.

Figure 3A:
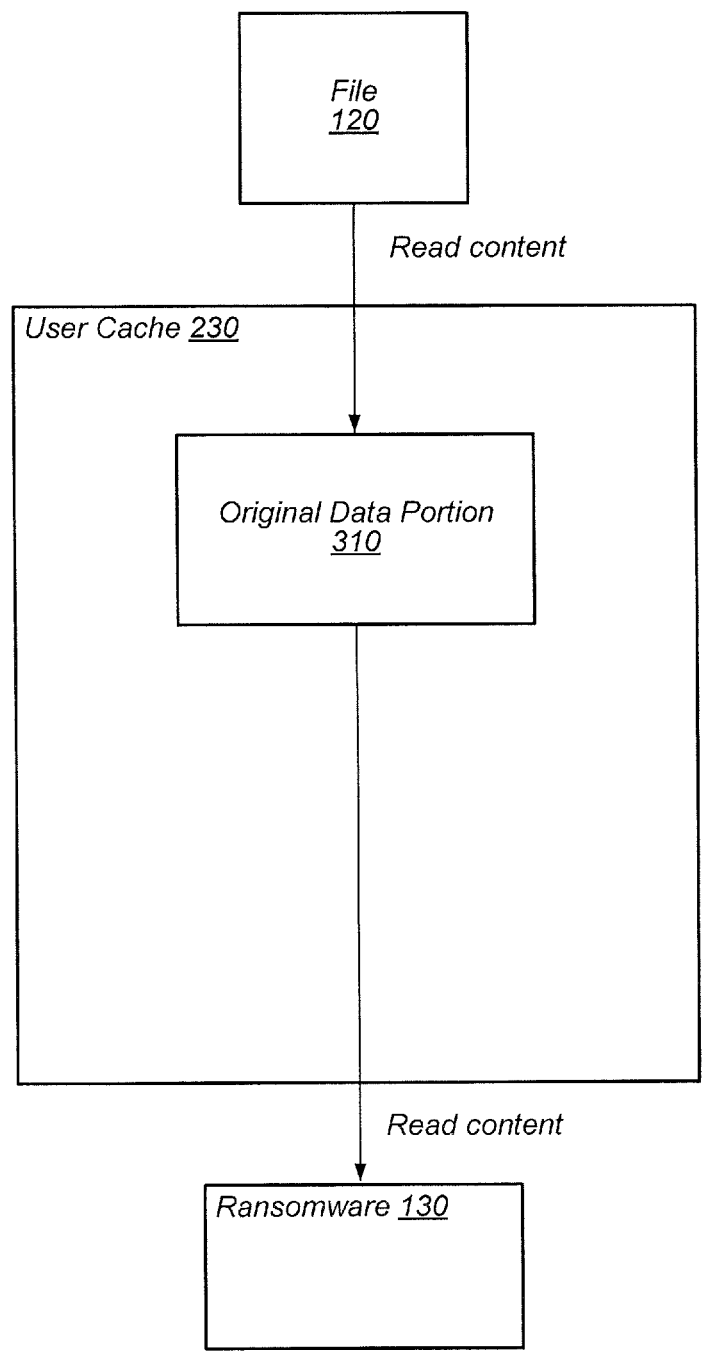
FIGS. 3A and 3B are diagrams illustrating an interaction between ransomware, a file, and a cache, according to some embodiments.
Figure 3B:
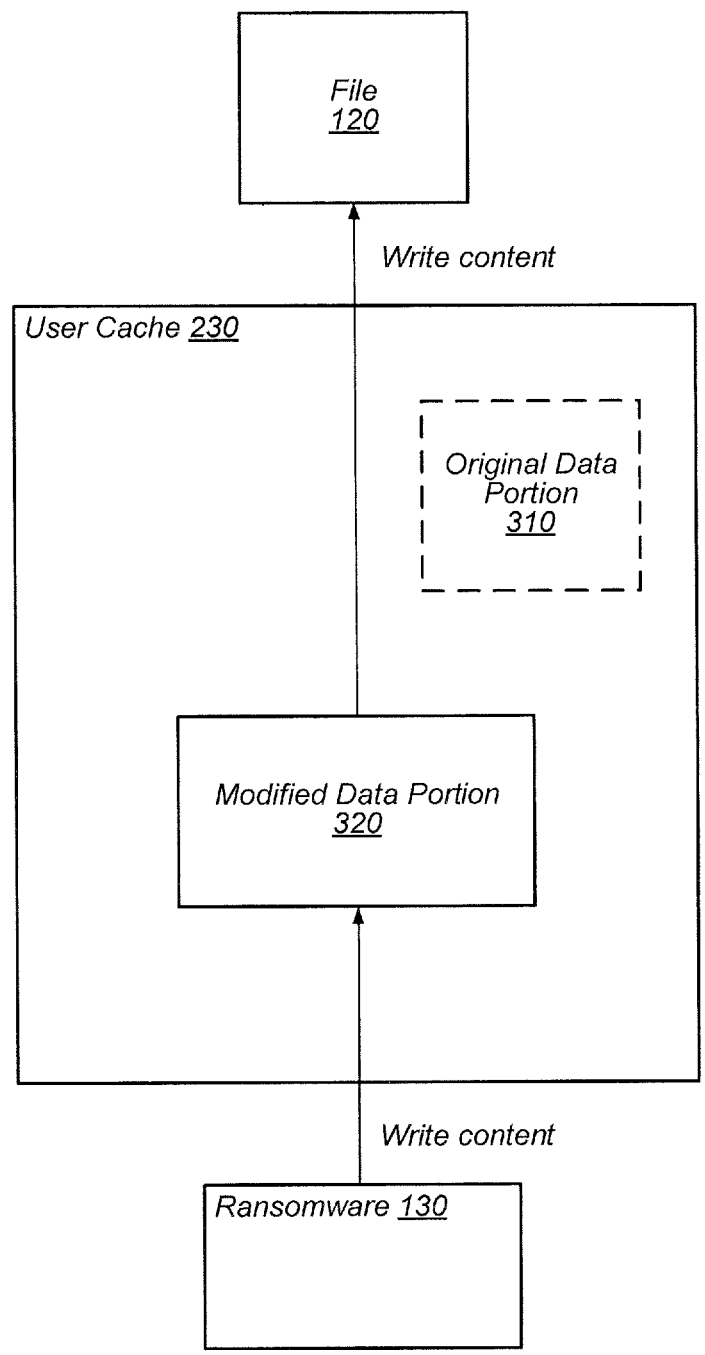

FIGS. 3A and 3B depict one embodiment of user cache 230 relative to read and write operations being performed by ransomware 130. These figures help illustrate how the utilization of user cache 230 (or any other cache, in various embodiments) can be helpful in detecting activity by ransomware 130.

In the embodiment of FIG. 3A, ransomware 130 is performing a read operation from file 120. This read operation is normally handled by an operating system—that is, ransomware 130 makes a program call to read contents of file 120, and the operating system receives that call, and then uses underlying device drivers and other functionality to cause contents of file 120 to be read from storage (hard disk, etc.). Ransomware 130 may read all or a portion of file 120 in order to then encrypt the underlying data before making it inaccessible to a user (e.g. by overwriting the original data with the encrypted data). Note that references herein to ransomware 130 "deleting" data may refer to either overwriting data or deleting a file, in various instances. Also, note that when ransomware 130 reads from file 120 and encrypts its data, it does not have to read the file in its entirety but can instead read and encrypt in smaller chunks. Even with piecewise reading and encryption, however, the techniques described herein still allow for mitigation of ransomware.

When the operating system handles the read operation from ransomware 130, an original data portion 310 becomes stored in user cache 230. The operating system may store original data portion 310 in user cache 230 as a routine operation (because a file that was recently read is oftentimes more likely to be read from again in the near future, compared to other files that were not recently accessed, for example). Original data portion 310 may also be stored in user cache 230 because the operating system may want to write to a hard drive in bigger chunks (larger amounts of data) than the size of a current file.

Accordingly, after the read operation of FIG. 3A, ransomware 130 has a copy of original data portion 310, but another copy of original data portion 310 has also been retained in user cache 230. Note that similar operations to those discussed relative to FIGS. 3A and 3B can occur for any cache, such as kernel cache 240, as well as any of hardware-implemented caches CPU cache 260, memory cache 280, and secondary cache 295.

Turning to FIG. 3B, user cache 230 is depicted relative to a write operation being performed by ransomware 130 (subsequent to the read operation of FIG. 3A). In this embodiment, ransomware 130 has completed its earlier read, and original data portion 310 from file 120 is still present in user cache 230. As shown, ransomware 130 has modified original data portion 310 and is now writing it back to file 120 as modified data portion 320. Modified data portion 320 may be an encrypted version of original data portion 310, for example. As per the read operation of FIG. 3A, the present write operation is handled by an operating system in various embodiments.

When ransomware 130 writes modified data portion 320, it may be stored in user cache 230 temporarily before it is actually written to permanent storage (e.g. persistent storage that retains data after a power cycle). Thus, modified data portion 320 is stored in user cache 230 (or another cache) before the contents of file 120 become permanently changed, in various embodiments. Because file 120 may not become irrevocably changed the instant that ransomware 130 issues a write instruction, this allows an opportunity to analyze modified data portion 320 relative to original data portion 310 to determine if ransomware 130 is performing a damaging operation. (Again, note that an observing or monitoring process may not be aware that ransomware 130 is prohibited malware at the time a read and overwrite are attempted; instead, ransomware 130 may simply be an unknown process.)

Accordingly, per FIGS. 3A-3B, when ransomware 130 reads data, a copy of that data may be stored in a cache. When ransomware 130 writes data, a copy of that data may also be stored in one or more caches prior to the write being stored to disk (or other permanent data storage). As discussed herein, there may be multiple levels of caches before getting to storage media, and thus in addition to a user cache (or in place of a user cache) there may also be one or more of a kernel cache, controller cache, physical device cache, or software application level caches. Each of these caches may be analyzed and used in various embodiments to detect ransomware.

Figure 4:
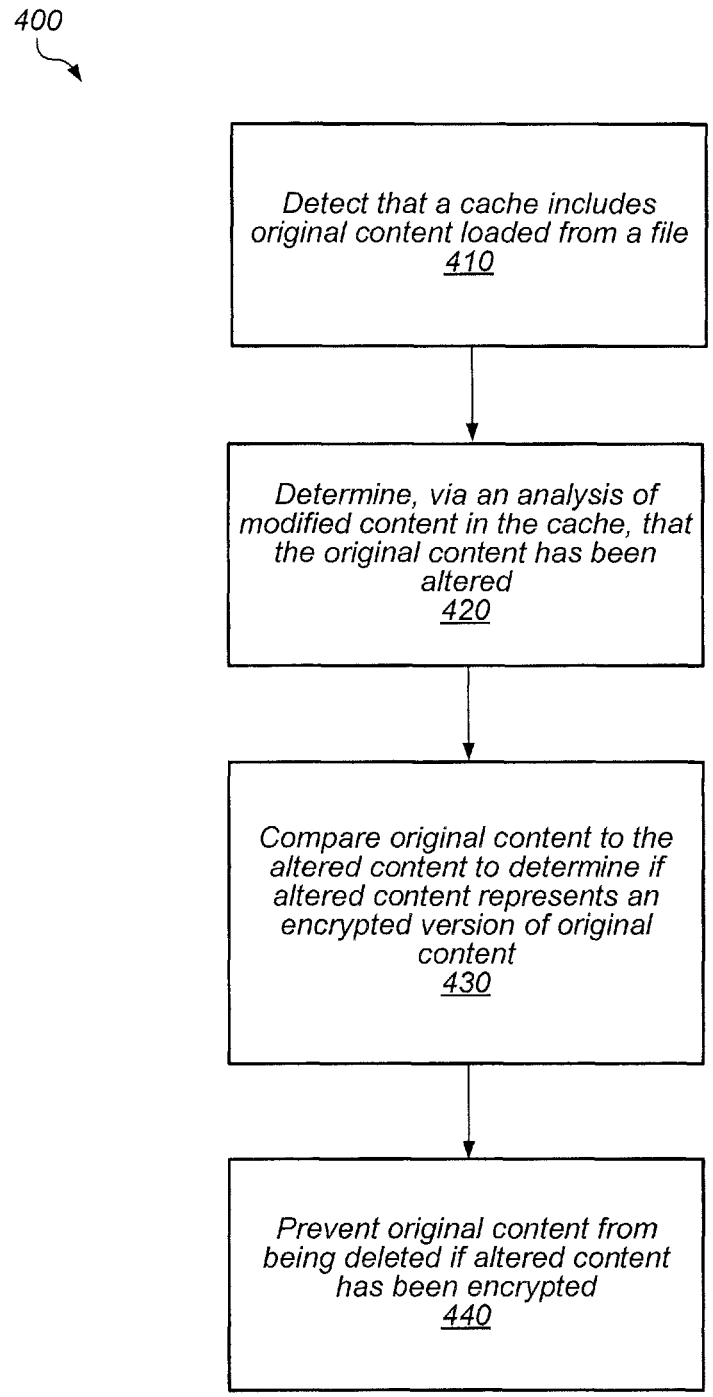
FIG. 4 illustrates a flowchart of a method that relates to determining if ransomware is believed to be operating on a computer system and taking a preventive action in response, according to some embodiments.

Turning to FIG. 4, one embodiment of a method 400 related to ransomware detection and mitigation is shown. The operations of method 400 may be performed by a program running on system 110, a hardware device attached to system 110, or any other suitable software or hardware, in various embodiments. In one embodiment, for example, operations in method 400 may be performed by a virtual machine monitor or other software outside the memory space of a virtual machine, thus making it more difficult for ransomware 130 to defeat monitoring. For ease of explanation, however, operations of method 400 are described below relative to system 110.

In operation 410, system 110 detects that a cache includes original content loaded from a file. This operation may include, in various embodiments, detecting that user cache 230 or kernel cache 240 has received content due to a read operation, for example. Operation 410 may also include detecting that a hardware-implemented cache, such as CPU cache 260, memory cache 280, or secondary memory cache 295 has received original content loaded from a file.

Note that in various instances, operation 410 may be performed in association with the read from a file, or may occur after the file has already been read (e.g., operation 410 can be performed even after file content has been present in a cache for some period of time). Operation 410 may be performed by a software process running on system 110, in some embodiments, such as a process executed by an operating system of a virtual machine, or by a virtual machine monitor or other process that is outside of a virtual machine. Operation 410 may also be performed by a hardware device attached to system 110.

In operation 420, system 110 determines, via an analysis of modified content detected in a cache, that original content of a file has been changed to produce altered content. (Thus, operation 420 may also include performing the analysis of modified content in various embodiments).

The analysis of modified content for operation 420 may include determining that a particular process (e.g., ransomware 130) has read a first copy of content from a file (which is now stored in a cache), then attempted to write a modified version of that content back to the file (with the modified version being stored in cache at least temporarily before being written to permanent storage).

Operation 420 thus also includes, in some embodiments, detecting that a cache has received particular data to be written to long-term storage and correlating that data to original content. Correlating two pieces of cached data (for the purposes of making a comparison between "before" and "after" versions) can be performed in a variety of ways. In one embodiment, user cache 230 (or any other of the caches mentioned herein) maintains contextual data about content that is stored in the cache. This contextual data may include but is not limited to: a process that accessed the content and caused it to be stored in cache; a location in permanent storage of the content; a filename and/or file path with which the content is associated; an offset or location within a file with which the content is associated (e.g., a particular segment, or bytes 4096-8191, etc.), a time the data was first stored in cache, a time the data was last accessed in cache, whether data was first saved in cache due to reading, or due to writing, or other information. By comparing contextual data for two pieces of content in cache (e.g., original data previously read from disk and modified data to be written to disk), system 110 can determine that the two pieces of content correspond to one another. Once it is determined that two pieces of content correspond to one another, they can be compared as described below.

In terms of correlating cached content (relative to ransomware detection), in general, a variety of further tactics to those discussed above can be used. In one embodiment, another user mode and/or kernel mode cache can be provided and matched against. Custom driver software can also be used to read the data from user mode/kernel mode caches. VMI can be used to read the user mode/kernel mode caches; specific opcodes in the CPU can be used to read caches; communication to a device controller can be used to read hardware caches; and specific code can be run on a device to read a cache. Also, hardware can be added before a controller and/or a device to read cache and compare it to the data from the operating system level.

In one embodiment user cache 230 (or another cache) manages content correlation automatically, and is programmed to determine that content to be written corresponds to an existing cache entry (based on one or more factors discussed above, for example). An existing cache entry may be overwritten/evicted from cache, for example, by incoming data that user cache 230 detects corresponds to previous data. Operation 430 (discussed below) may be performed at this point, in some embodiments.

Accordingly, in operation 430, two pieces of content in cache are compared by system 110 to determine if altered content in the cache (e.g., to be written) represents an encrypted version of original content (e.g., that was previously read).

In one embodiment, this comparing includes using a calculated entropy level of the original content, and then comparing that to a calculated entropy level for the altered content. A goal of encryption is frequently to make data look as random as possible (high entropy level). Thus, if system 110 sees a file read from disk that has a relatively low entropy level, then a modified file is written back to disk with a relatively high entropy level, it can be assumed (in various embodiment) that the modified file represents an encrypted version of the original file. Simply opening a text document and changing a few words (editing a report or manuscript, for example) is unlikely to have a significant change on the entropy level of that file, in one or more embodiments. Entropy level can therefore be used as a proxy for encryption in various instances.

Entropy can be calculated as a degree of randomness of data in a file or file portion in some embodiments. For example, an entropy level on a 0-100 scale could be determined by analyzing particular portions of data relative to particular other portions of data for a particular data segment or file. For purposes of comparison, an entropy level can be determined as high, low, or intermediate relative to other files. To determine if an entropy change is believed to indicate an encryption operation, various standards can be employed. Using the 0-100 scale, a particular threshold shift could indicate encryption. This threshold shift could be measured in absolute terms (e.g., +50 points on a 100 point scale) or could be measured in percentage terms (e.g., 50%+). A lower threshold of either could be taken as well (e.g., if a file garners at least a 50 point jump or a 50% increase, an encryption event will have been deemed to occur). Many different threshold levels may be set in various embodiments, of course. Different entropy threshold levels may also be set for different types of files (originally higher compressed files such as ZIPs, MP3s, MP4s, JPGs etc. may have different threshold entropy difference levels set relative to other file types such as plain text, MS-WORD docs, GIF, etc.). Thus, for an MP3 file, different amounts of entropy change (before/after writing), for example, may be deemed to indicate an encryption operation by system 110 relative to another file type such as plain text (.txt). In one embodiment with a 0-100 entropy scale, 100 would represent pure random data. In this embodiment, any data that scores above a threshold (e.g., 80 points) would be considered to be encrypted. (Note that other entropy scales are possible, such as 0-8, and entropy scales may be normalized in various embodiments.) Various embodiments for determining if one piece of content corresponds to another piece of content also include but are not limited to system 110 performing a hash of the two, comparing each bit by bit; performing fuzzy (piecewise) hashing of the two pieces of content; or cross validating or any other similar mechanism.

In a related aspect, system 110 can also attempt to capture encryption keys used by a ransomware program. For example, if during a scan system 110 sees a buffer (in a cache or elsewhere) which in looks random (e.g. high entropy) but has a length of an encryption key (for symmetric encryption—128 bit, 256 bit, for example; for asymmetric keys 1024 bit, 2048 bit, for example) then the data in this buffer may be an encryption key used by ransomware. In this case, system 110 can save or remotely transmit possible encryption key information to an administrator.

In operation 440, system 110 prevents original content from being deleted if altered content is believed to have been encrypted, in one embodiment. Prevention from deletion may take various forms, as discussed below.

In one embodiment, operation 440 includes causing an alert to be transmitted to a user of system 110 (or a user of another system). This alert may inform the user that a program appears to be attempting to encrypt data and delete the underlying data, and then present the user with a dialog asking the user whether they wish to allow the operation to proceed, or to halt the operation. Accordingly, operation 440 may also include at least temporarily halting original content on disk (or other storage) from being overwritten with altered content that may be encrypted. This can include having an operating system pause execution of a process that is attempting to perform the overwrite (e.g., ransomware 130), or simply pausing the write operation and preventing its completion until a user grants consent. If the user is not performing encryption operations herself, she may be able to prevent or mitigate damage by ransomware 130 once she is alerted to its activity.

In another embodiment, operation 440 includes causing a backup copy of original content to be sent to a remote server (or another destination). This backup copy may be sent automatically and without user intervention as a preventative measure. By transmitting the original content to a remote system that is out of reach of ransomware 130, the data may be protected even if ransomware 130 successfully deletes it. In one embodiment, detecting that one or more encryption/deletion events have occurred within a particular timeframe may trigger a full system backup for system 110 (by executing a remote backup plan for a number of different files and/or directories on system 110). Thus, as an example, if system 110 observes that at least 10 potential encryption/deletion events have occurred (e.g., altered content with high entropy is overwriting original content with relatively lower entropy) within a 2-minute timeframe, then system 110 may consider itself to be under attack by a ransomware program and attempt to quickly back up as many files as possible (perhaps according to a specified plan in which the most critical files or directories are backed up first).

In one embodiment, operation 440 includes not just sending a backup copy to a remote server, but encrypting that backup copy first using a public key of the server (leading to a situation in which only the server can decrypt, in various embodiments). This may provide additional data security and privacy in certain cases. Operation 440 also may include fooling a ransomware program into thinking it has been successful—for example, intercepting its activities, giving it different bytes to encrypt and/or redirecting results of encryption to a different free location.

A whitelist of programs, in some instances, may also be used to determine if a process should be allowed to make an encryption and/or deletion operation on data. A user may be attempting to encrypt a file using a legitimate security program, for example, or could be using a compression program that might also trigger an alert from the method of FIG. 4. Thus, a whitelist of known binaries (or other information) can be maintained by system 110 (or another system), and if a program is on this list, the user may not be alerted about a perceived encryption/deletion operation. Note that checking a program against a whitelist can involve checking the program on both a filesystem (e.g. on disk for example) and in memory (e.g., as actively loaded and/or running on the system).

Figure 5:
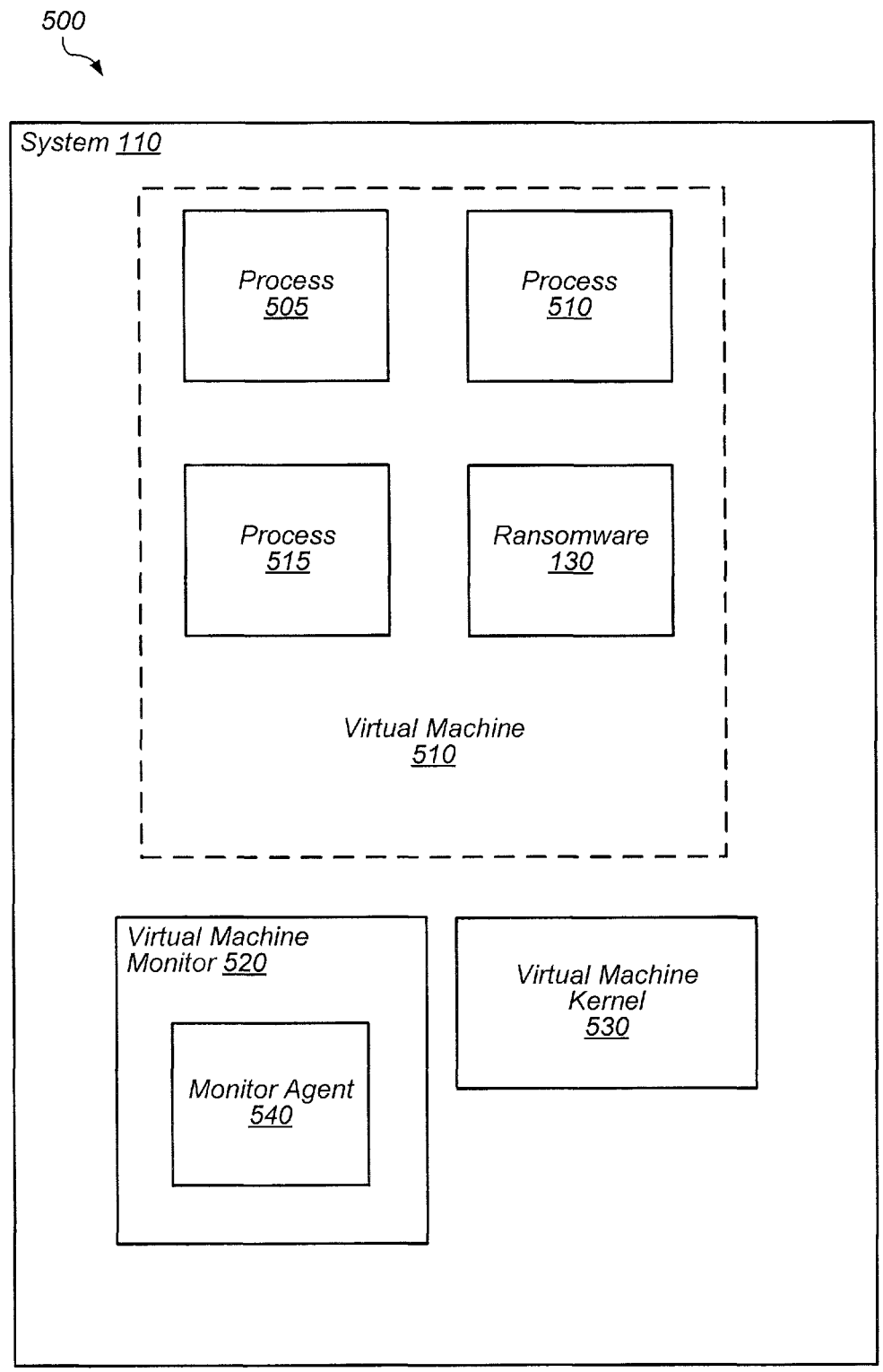
FIG. 5 is a block diagram of one embodiment of a system in which a virtual machine monitor may be used to help detect potential ransomware in a virtualized environment (and to help avoid circumvention by the ransomware).

Turning now to FIG. 5, another embodiment of system 110 is shown in which system 110 is configured to run one or more virtual machines.

As shown, virtual machine 510 is being used to run processes 505, 510, 515, and ransomware 130. Additional virtual machines not depicted may also be running on system 110.

Ransomware 130, in some embodiments, may attempt to prevent its own deletion or containment by eliminating monitoring or anti-virus programs that are running on system 110. Thus, in a system that is simply running one instance of an operating system on top of bare hardware, ransomware 130 has the potential to take over the entire system.

In the embodiment of FIG. 5, however, virtual machine kernel 530 is used to run one or more virtual machines that are self-contained in that processes running inside those virtual machines may not be able to see outside of their own limited memory space. Thus, virtual machine monitor 520 is a process that is executing outside virtual machine 510 in this embodiment. Virtual machine monitor 520 may allow for virtual machine introspection on virtual machine 510. Virtual machine introspection allows various aspects—process data, instructions, memory, etc. of virtual machine 510 to be observed from outside the virtual machine itself. Monitor agent 540 is included within virtual machine monitor 520 in the embodiment shown, though it may also be a different process outside of virtual machine 510 in various other embodiments. By using virtual machine introspection techniques, ransomware 130 can potentially be detected by an outside process that it may be unable to defeat. (Accordingly, in one embodiment, monitor agent 540 may perform some or all of the operations of method 400.)

Note generally that caches can be read at different levels (using VMI techniques or not), such as user mode caches of a virtual machine, kernel mode caches of a virtual machine, caches of a virtualized controller, caches of a virtualized device, caches of a non-virtualized controller, and caches of a physical device. Thus, using VMI in some instances, contents of a virtualized (e.g. software-implemented) version of what would ordinarily be a physical hardware cache can be easily accessed (and potentially more easily than an actual physical hardware cache).

Computer-Readable Medium

Figure 6:
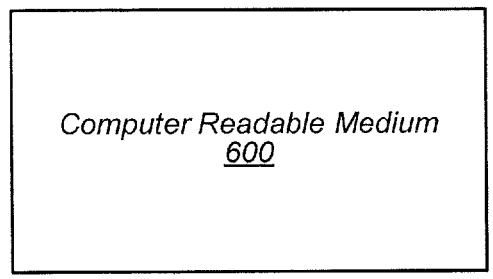
FIG. 6 is a block diagram of one embodiment of a computer readable medium.

Turning briefly to FIG. 6, a block diagram of one embodiment of a computer-readable medium 600 is shown. This computer-readable medium may store instructions corresponding to the operations of FIG. 4 and/or any techniques described herein. Thus, in one embodiment, instructions corresponding to monitor agent 540 may be stored on computer-readable medium 600.

Program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript. Note that as used herein, the term "computer-readable medium" refers to a non-transitory computer readable medium.

Computer System

Figure 7:
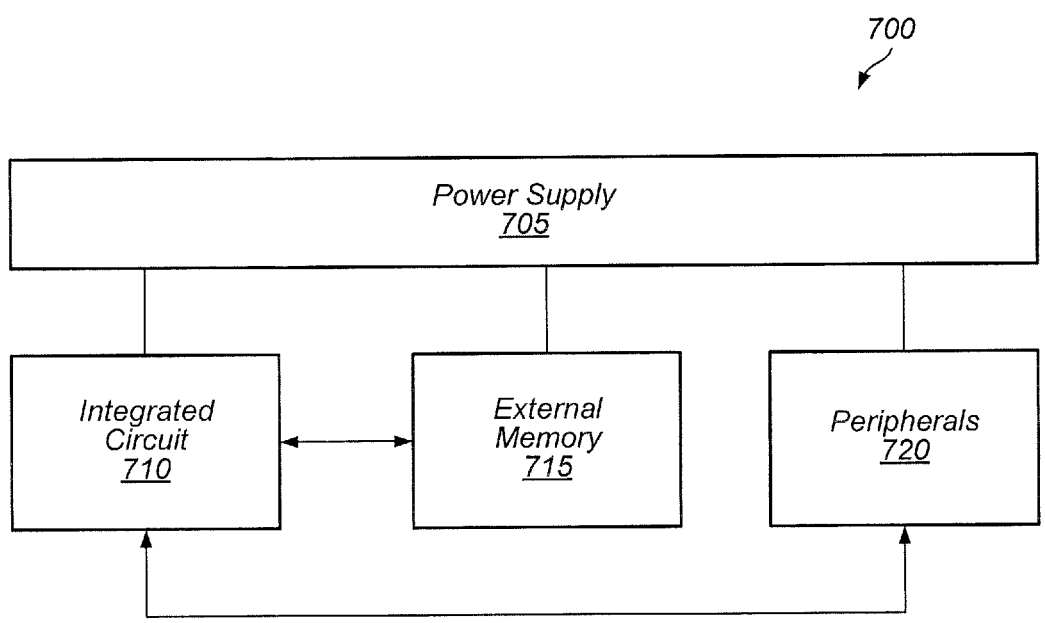
FIG. 7 is a block diagram of one embodiment of a system.

In FIG. 7, one embodiment of a computer system 700 is illustrated. System 110 thus includes one or more features of computer system 700 in various embodiments.

In the illustrated embodiment, system 700 includes at least one instance of an integrated circuit (processor) 710 coupled to an external memory 715. The external memory 715 may form a main memory subsystem in one embodiment. The integrated circuit 710 is coupled to one or more peripherals 720 and the external memory 715. A power supply 705 is also provided which supplies one or more supply voltages to the integrated circuit 710 as well as one or more supply voltages to the memory 715 and/or the peripherals 720. In some embodiments, more than one instance of the integrated circuit 710 may be included (and more than one external memory 715 may be included as well).

The memory 715 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 710 in a chip-on-chip configuration, a package-on-package configuration, or a multi-chip module configuration.

The peripherals 720 may include any desired circuitry, depending on the type of system 700. For example, in one embodiment, the system 700 may be a mobile device (e.g. personal digital assistant (PDA), smart phone, etc.) and the peripherals 720 may include devices for various types of wireless communication, such as Wi-Fi, Bluetooth, cellular, global positioning system, etc. Peripherals 720 may include one or more network access cards. The peripherals 720 may also include additional storage, including RAM storage, solid state storage, or disk storage. The peripherals 720 may include user interface devices such as a display screen, including touch display screens or multitouch display screens, keyboard or other input devices, microphones, speakers, etc. In other embodiments, the system 700 may be any type of computing system (e.g. desktop personal computer, server, laptop, workstation, net top etc.). Peripherals 720 may thus include any networking or communication devices necessary to interface two computer systems.

Further Details Regarding Detecting Encryption

As indicated above, preventing ransomware may involve detecting that a process is performing an encryption operation in various embodiments. Determining whether a process is performing encryption is useful in a variety of contexts, however, which are more fully discussed below. One of these contexts is identification of performance bottlenecks, while another of these contexts relates to command and control scenarios for malware.

Note that as used herein, the phrase "determining that" (or "determining whether") "a process is performing an encryption operation" does not require that the process still be in the act of performing a (potentially yet incomplete) encryption operation at the time the determination is made. Instead, this phrase indicates that the process may be either in the process of still executing one or more attempted encryption operations, or that the process has already performed an encryption operation.

Figure 8B:
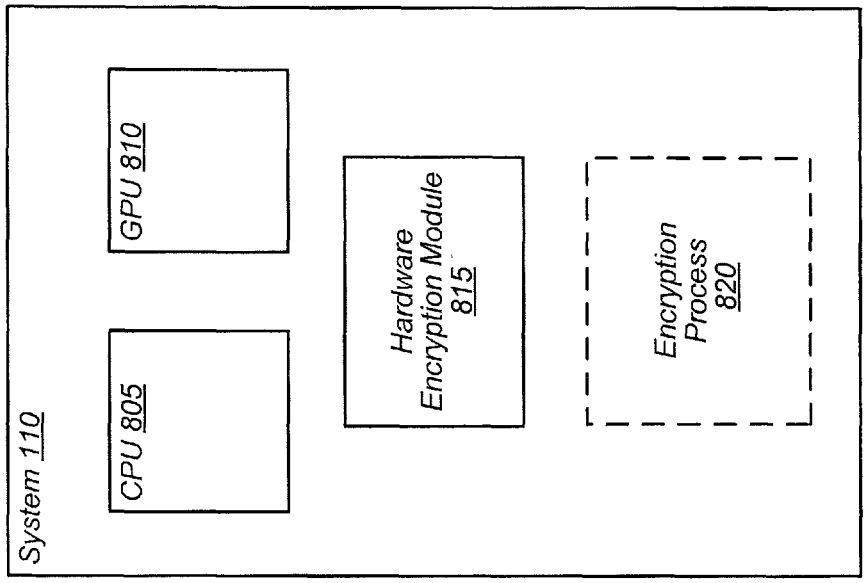
FIGS. 8A and 8B are block diagrams of embodiments of a system and relate to cryptographic operations.
Figure 8A:
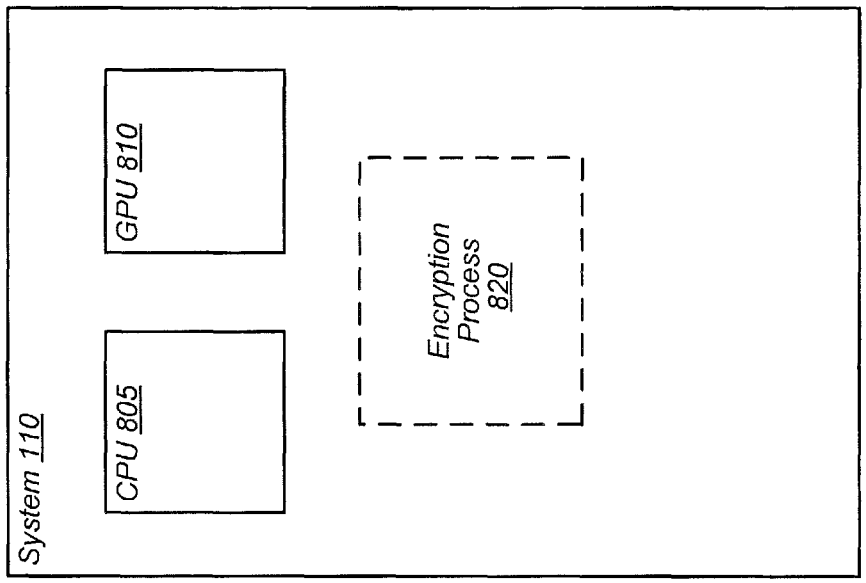

Turning to FIG. 8A, a block diagram is shown of one embodiment of system 110. In this embodiment, system 110 has a CPU 805 and GPU 810. It also includes an encryption process 820 (which may be an executable file loaded into memory or stored on disk, for example).

In this embodiment, encryption process 820 performs encryption operations on various data by executing instructions on CPU 805 and/or on GPU 810. CPU 805 and GPU 810 may not be optimized to perform encryption, however. Thus, encryption process 820 may consume a large amount of system resources (execution time, memory usage, and power consumption, for example) to perform encryption. Usage of CPU 805 and/or GPU 810 may be relatively inefficient compared to more specialized types of hardware. If encryption process 820 performs enough encryption in this embodiment, performance of system 110 may be severely impacted—encryption process 820 may run slowly, as well as various services run by system 110 (which may or may not depend on encryption process 820).

Accordingly, in FIG. 8B, another embodiment of system 110 includes a hardware encryption module 815. Hardware encryption module 815 includes, in various embodiments, one or more specialized pieces of hardware that are capable of performing encryption. Hardware encryption module 815 may allow encryption process 820 to perform encryption operations more rapidly and/or with the use of fewer resources (e.g., allowing for CPU offloading of encryption). Thus, hardware encryption module may provide hardware support for one or more encryption ciphers, such as AES (Advanced Encryption Standard), Triple-DES (Data Encryption Standard), RC6, RC5, Elliptic Curves, or others.

In one embodiment, hardware encryption module 815 includes an FPGA (field programmable gate array) chip that provides for specialized encryption functions. In another embodiment, hardware encryption module 815 includes an ASIC (Application Specific Integrated Circuit) that provides for specialized encryption functions. It generally would not be economically practical to simply install hardware encryption module 815 into all computer systems used by an entity. Instead, it may be beneficial to determine if performance of a computer system such as system 110 is impacted heavily enough by sub-optimal encryption operations to make it worth installing special hardware. This aspect is discussed further below. (Note that analysis of encryption performance may be applied not just to a single machine, but across multiple physical machines, multiple virtual machines, server groups, etc., to determine performance impacts.)

Another context in which encryption detection is relevant is a command and control scenario, which may involve a remote operator attempting to covertly execute commands on a target.

Figure 9:
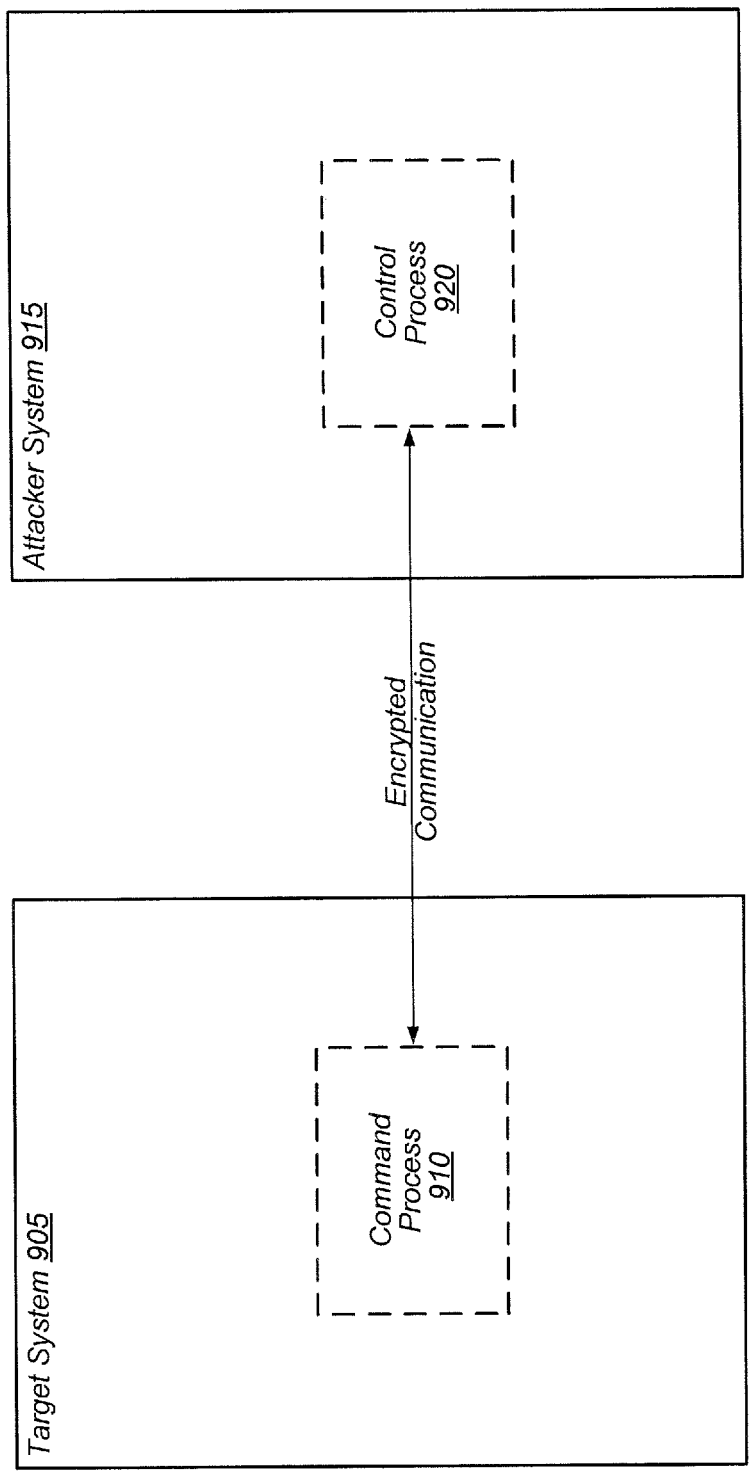
FIG. 9 is a block diagram of one embodiment of a system including a target system and an attacker system.

Thus, turning to FIG. 9, a block diagram is shown of one embodiment of a system including a target system 905 and an attacker system 915. Target system 905 and attacker system 915 may have any or all of the features of system 110 in various embodiments.

In this embodiment, target system 905 has been compromised by a user of attacker system 915. Thus, target system 905 is executing a command process 910, which may be used to allow execution of arbitrary commands. Attacker system 915 is in communication with command process 910 via control process 920, which is executing on attacker system 915.

In order to avoid detection, command process 910 and control process 920 may use encryption to communicate with each other. By sending encrypted communications, a network sniffer, intrusion detection system (IDS), and/or firewall may be unable to prevent attacker system 915 from effectively controlling target system 905. Thus, detecting encryption by command process 910 may help increase system and site-wide security, in various embodiments.

Figure 10:
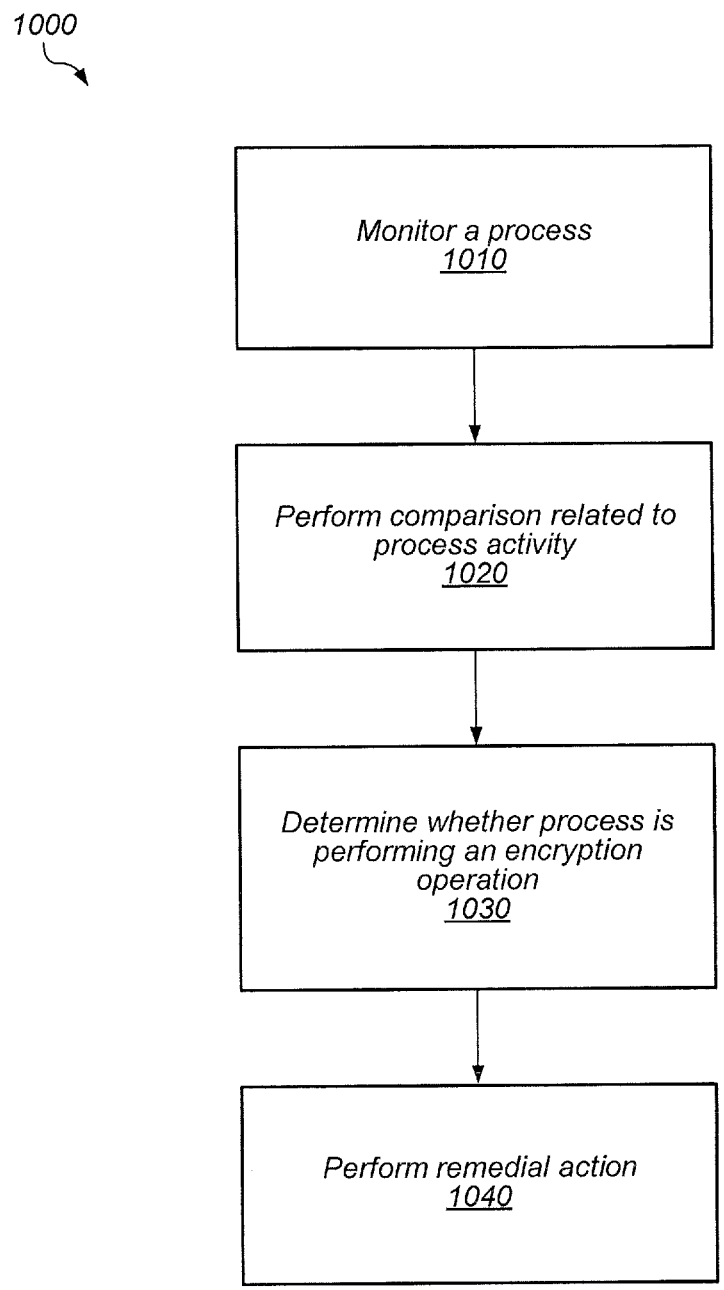
FIG. 10 is a flow chart of an embodiment of a method related to detecting encryption being performed by a process.

Turning to FIG. 10, one embodiment of a method 1000 related to encryption detection is shown. The operations of method 1000 may be performed by a program running on system 110, a hardware device attached to system 110, or any other suitable software or hardware, in various embodiments. In one embodiment, for example, operations in method 1000 may be performed by a virtual machine monitor or other software outside the memory space of a virtual machine, thus making it more difficult for ransomware, command and control programs, or other malware to defeat monitoring. For ease of explanation, however, operations of method 1000 are described below relative to system 110.

In operation 1010, system 110 monitors a process that is executing on system 110. This process may, in the course of monitoring and other operations, be revealed to be ransomware, command and control software or other malware, or be revealed as a performance bottleneck. Operation 1010 may include assessing a number of different programs on system 110 to determine which of those processes should be monitored, in various embodiments, and may therefore include monitoring multiple processes simultaneously.

The monitoring of operation 1010 may be based on certain monitoring criteria in one or more embodiments. It may be impractical, for example, to monitor all processes on system 110 for encryption operations, as this could impact system performance too heavily in various situations.

Thus, monitoring criteria for operation 1010 may exclude processes that are on a whitelist of known acceptable programs. Whitelisted programs may include certain operating system files, for example, or commercial programs that make use of encryption and are considered acceptable use by a system administrator. A system administrator may thus designate different programs for whitelisting depending on the specific configuration desired for a system and/or a server pool. (In some cases, a system administrator may not care about usage of a commercial encryption product, for example, while in other cases a system administrator may want to deliberately leave such products off a whitelist in order to identify potential performance bottlenecks).

Whitelisting of programs that are not intended to be monitored by operation 1010 can also include various techniques to determine that an instance of a program on system 110 does in fact correspond to a program listed on a whitelist. In one embodiment, hash values for known programs are computed beforehand, and then compared to hash values of programs on system 110. If a hash value matches, then the program on system 110 is considered to be part of the whitelist (and may not be monitored). Fuzzy hashing may also be used to see if a program on system 110 is the same as one on a whitelist. Hash values or other matching values used for a whitelist can also be digitally signed by an entity (e.g. a trusted company) so that they cannot be manipulated, which can provide greater security for whitelist checks.

Other monitoring criteria that may be used for operation 1010 can include whether a process exceeds a threshold level of usage for storage access, network access, and/or processor usage. If a process exceeds a threshold level of storage access or processor usage, for example, this may indicate that the process represents a potential performance bottleneck. Thus, for example, a process that exceeds 15% CPU usage, or exceeds 1500 Kb/s of disk usage for example, might be a candidate for monitoring. A process that exceeds a threshold level of network usage (such as 100 Kb of data transmission or data reception in an hour, for example) may indicate potential malware such as command and control software. In one embodiment, a process that increases a size of a network input relative to an output could also be monitored (in some embodiments, symmetric encryption done at 1:1 may not be monitored). Thus in some embodiments, if a program never accesses the network (or sends substantially no data over the network) it is less likely to be a command and control program and may not need monitoring, in various embodiments.

Monitoring criteria may also include access to sensitive files. Thus, file access can be monitored to see if a program is accessing (or attempting to access) particular data (which may be stored either locally or remotely). If a process attempts to access a production database, for example, or files containing restricted or classified information, or personally identifying information, etc., then this may be a reason to monitor the program for potential encryption operations. Monitoring criteria may also include permission levels of a process (or attempts for a process to raise its own permission level). Processes with detected levels of input/output (e.g. reads or writes to disk, network, etc.) that are higher than a threshold and/or higher than other processes on a computer system may also be monitored. In one embodiment, processes with an input/output level in the top 5% (or another percentage) of observed system processes (on one system or many systems), for example, could be monitored.

Monitoring operation 1010 includes analyzing different program characteristics in various embodiments. Thus, monitoring operation 1010 can include monitoring data inputs (e.g. data read from network, permanent storage, or RAM), data outputs (e.g. data written to network, permanent storage, or RAM), processor usage, memory usage, network usage, I/O usage for devices such as a keyboard, mouse, or touchscreen, etc.

In operation 1020, system 110 performs a comparison related to activity of a monitored process. The specifics of this comparison may vary by embodiment, and are used in various instances to determine (in operation 1030) whether a process is performing an encryption operation. Further details are provided below.

As an initial matter, note that the comparison performed in operation 1020 may have certain precursor events in various embodiments. That is, different factors may be used to determine whether operation 1020 is to be performed, in various embodiments.

In one instance, prior to operation 1020, system 110 determines that a first action performed by a monitored program is reading first data from a first location accessible to system 110 and that a second action performed by the monitored program is outputting second data corresponding to the first data. This instance may relate to ransomware detection as discussed above, and operation 1020 may be performed responsive to this second action by a monitored program (outputting second data corresponding to the first data). Thus, relative to this embodiment, data may be read from a file, for example, encrypted, and written back to a file. Data could also be read from another source, encrypted, and written to a network connection (which might apply to a process stealing corporate data from a database for example and transmitting it outside of the corporate network). A comparison of contents of the first data (source data) can be performed in operation 1020 relative to contents of the second data (output data). Based on the results of this comparison, operation 1030 may determine that a monitored program has performed an encryption operation.

In following with the above paragraph, comparing the first data (source data) with the second data (output data) may include doing a comparison of entropy levels in this embodiment. If a file with a low entropy level is read from disk, for example, and written back to disk, it may indicate malware such as ransomware (as discussed above).

In some embodiments, a change in file format of source data to a different file format can indicate encryption. Thus, comparing the first data with the second data may also include, in one embodiment, determining that the first data (e.g. source data) corresponds to a first file format and the second data (e.g. output data) does not correspond to a list of one or more file formats including the first format. For example, if the first data is in a text-based format such as Microsoft Word (.DOC, .DOCX), but the data is then changed (e.g., by a monitored process) to a non-text format, this may indicate that an encryption operation has occurred. File format compliance can be checked in a variety of manners, such as analyzing header data, formatting data, compression data, or other metadata. Note that another way to use metadata is to calculate a histogram of a file and compare it to other files for the same type (like doing word frequencies in a language for example). Thus, word or character frequencies in a file, compared to a calculated average from numerous samples for that file type, for example, can trigger encryption detection by a system. In some instances, a histogram for data must differ greater than some amount for this to occur (e.g., some number of standard deviations beyond an average).

Thus, various file formats may be grouped together into different lists of comparable file formats. Text-based source data in one format from a group could be compared to see if the file has simply been converted (to another text-based format), or encrypted. Likewise, a video file that changes to a non-video file or to an unrecognized format altogether may indicate encryption. Format groups could include for text file types such as (.RTF, .DOC, .DOCX, .WPD, .TXT, etc.). Image format groups could include .JPG, .GIF, .PNG, .TIF, etc.). Numerous different file format groupings can be used in various embodiments.

In another embodiment, operation 1020 includes making a comparison (e.g., of contents of first data that has been read by a process to contents of second data that has been output by the process) based on a fuzzy hashing analysis. Thus, data input by a process (e.g. that is being monitored) can be analyzed in piecewise fashion to see if resulting output data may be an encrypted version of the input data. If the input data is fuzzy hashed into 20 different sections, for example, but hash values for 15 of those 20 sections are unchanged in the output data, then it is not likely that a whole file has been encrypted. However, if 19/20 or 20/20 sections (or some other threshold criteria) have been changed, then there is a much greater chance that data has been encrypted. In some embodiments, fuzzy hashing may be used to speed up monitoring and detection—by doing a relatively quick fuzzy hash, various data can be excluded from further analysis in certain instances, thus freeing processing and memory resources for other computing tasks. If a fuzzy hash reveals wide-scale changes in data, however, then that data may be subjected to further actions (such as entropy change analysis, file format change analysis, etc.). In one embodiment, fuzzy hashing can also be used to narrow scope for detecting whether data has been encrypted. If fuzzy hashing analysis of a file shows that 9 out of 20 sections have been altered, for example, those 9 sections can be analyzed (using before and after versions) to see if entropy has been significantly changed. This operation could be used to detect an attacker encrypting only certain portions of a file, for example.

Operation 1020 also relates to opcode frequency analysis, in one embodiment. In this embodiment, a comparison is performed of a distribution of opcodes (for a monitored process) of a plurality of instructions of the monitored process to benchmark data. This comparison may server (e.g. in operation 1030) to allow system 110 to determine if an encryption operation is being made.

More particularly, certain opcodes may appear with greater frequency in software-implemented encryption schemes than in other types of code, in various instances. For example, a higher frequency of XOR (exclusive-or) opcodes may indicate that a process is performing encryption. Benchmark data for non-encrypting programs can be collected and aggregated and then used as a baseline for comparisons. If benchmark data indicates that most programs have 2.5% of their instructions as XOR but that a monitored process is executing 30% XOR instructions (as an example), this comparison may be used to determine that the monitored process is performing encryption. Furthermore, opcode frequency analysis can also be used relative to known encryption programs or programs that have encryption components. A web browser may have to perform encryption to maintain an HTTPS connection, for example, but is usually not considered to be malware (unless infected). Thus, benchmark data for web browsers might show a higher than average use of XOR (or other instruction opcodes), but still fall below a suspect threshold for performing significant encryption operations. (As noted above, of course, web browsers may be whitelisted in various embodiments as well.)

In some instances, a dynamic threshold can be used relative to benchmark data, with each process (or categories of processes) having a different configurable threshold for, e.g., a frequency of XOR or other opcode usage. Further, for certain processes (such as a web browser) that are known to perform encryption in ordinary usage, a comparison can be made by system 110 of data that is shown to the user prior to encryption and after, as well as examining client to server traffic to a state machine to see if the traffic supports the notion that the browser should be performing encryption. As an example, consider a web browser that had not transmitted or received data in over an hour. If this web browser then starts performing encryption operations (particularly if greater than a threshold in one embodiment), it may be infected by malware as it would generally be unusual to observe this activity (browsers typically only encrypt when actively communicating on SSL).

In operation 1030, system 110 determines if a monitored process is performing an encryption operation, in one embodiment. Operation 1030 is based on results of a data comparison discussed above in which contents of first data that has been read by a process are compared to contents of second data that has been output by the process, in various embodiments.

Thus, operation 1030 may include determining a level of entropy in a first data portion and a level of entropy in a second corresponding data portion to see if the entropy level increased significantly. An entropy increase from below 7 on a 0-8 entropy scale to a 7 or above could indicate an encryption operation, for example (note that other thresholds and scale sizes and gradations can be used in some embodiments).

Besides looking at entropy changes, operation 1030 can also include determining if a substitution cipher has been used to encrypt data. In a text-based document, for example, letters of the alphabet can be substituted for one another to render a source text illegible. If all As are replaced with an X, and all Bs are replaced with an O, etc., then a user's document may become unusable. By performing a letter frequency analysis relative to a known document language, substitution ciphers can be detected (and it can be deduced that a monitored process is performing encryption). In English, for example, the most common letters used in text are E, A, O, and I. If text data is changed, however, and now has a histogram where the most common letters are P, Q, X, and Z (relatively uncommon letters) this can indicate use of a substitution cipher.

In operation 1040, system 110 performs a remedial action in various embodiments, which may be done in response to determining that a monitored process is performing an encryption operation. Note that more than one remedial action can be performed, of course.

In one embodiment, operation 1040 includes transmitting an electronic message to a system administrator indicating that a monitored process may be suspicious. Thus, an administrator could get an email, text message (SMS), or other communication giving details of a process believed to be performing encryption, such as time, date, IP address, process name, and various other details and metadata that may be available. Such a message can enable system administrator to take further corrective actions if desired.

In another embodiment, operation 1040 includes logging behavior of a monitored process that is believed to be performing an encryption operation. The logging may include capturing any number of process details, such as location, size, userID associated with process, checksum or other hash information, etc. Logging may also include transmitting a copy of the process and/or files associated with the process to an email address or another computer system for further analysis (e.g. by a system administrator, IDS engine, etc.). In yet another embodiment, operation 1040 includes quarantining a monitored process determined to be performing an encryption operation. The quarantining may include suspending access by the process to storage, to memory, to CPU, to a network interface, or to other resources. In some instances a process may be quarantined until and unless a system administrator approves removing the process from quarantine. Note that remedial action 1040 occurs automatically without explicit user involvement in various scenarios.

In one embodiment, operation 1040 includes creating a user notification regarding encryption activity of a monitored process. This user notification could be to a user who is actively logged in to system 110, or to any other designated user. The user notification can, like a message to the system administrator, include any number of details about suspected encryption activity being performed by a process.

In one embodiment, a created user notification includes information regarding system resources used by a monitored process over time. Such information may be relevant to performance analysis, and can include an average percentage of processor (e.g., CPU or GPU) use, a total amount of processor usage (e.g., in hours, minutes, seconds, and days), a disk read usage amount, a disk write usage amount, etc. A process that uses a large amount of resources may be of interested to a system administrator, for example, as encryption operations could represent a performance bottleneck for a server. Thus, in another embodiment, method 1000 includes determining an amount of system resources (CPU, disk, network bandwidth, etc.) of system 110 used by a monitored process over a period of time. Such information may be periodically collected by a monitoring process on system 110.

In another embodiment related to performance, method 1000 includes determining an amount of system resources used over a period of time by a process, and estimating an amount of reduction in use of the system resources based on introducing one or more hardware devices that support encryption operations to system 110. A process that is consuming a substantive amount of system resources, for example, by executing encryption operations on a CPU and/or GPU might be able reduce that use significantly by instead executing encryption operations on a specialized hardware device such as hardware encryption module 815. Depending on different specifications for hardware encryption module 815 in various embodiments, and depending on different particular encryption operations performed by a monitored process, different estimates may be provided to a user. If a process has used 120 hours of CPU time in a two-week period, for example, an estimate provided to a user might indicate that introducing certain encryption hardware might reduce this usage by 50% to 60 hours. Other metrics may be used when providing an estimated amount of reduction in use of system resources to a user, and may be qualitative in some circumstances (e.g., minor reduction, mid-sized reduction, large reduction, etc.).

Access by a monitored process to known cryptographic libraries and/or cryptographic functions is also used, in various embodiments, to determine whether a process is performing an encryption operation. System 110 may have cryptographic functions available as part of libraries that are already installed, for example, and if a process accesses those functions it can be determined that it is doing so to perform an encryption.

Determining if a process is accessing a cryptographic function (via an operating system, built-in compiling functionality, or via another file accessible to a computer system) can be performed, in one embodiment, by analyzing hash values. Known cryptographic libraries can be hashed for example and if a monitored process accesses a file having the same hash, it can be inferred that the process is accessing cryptographic functionality. Fuzzy hashing can be used in some instances as well, in case small portions of a library have been modified from a known version of a library (to see if a threshold number of fuzzy hash values match). Contents of a process itself can also be analyzed to see if it has built-in cryptographic functions that have been compiled into the process (e.g. by analyzing, via hash values, individual portions of the process). In some instances, the name of a file can also indicate the use of an already-known cryptographic library.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
based on monitoring criteria, monitoring, at a computer system, a plurality of actions performed by a process that is executing on the computer system, wherein the monitoring includes identifying that the process exceeds a threshold level of processor usage;
determining that a first action of the plurality of actions is reading first data from a location accessible to the computer system and that a second action of the plurality of actions, performed subsequent to the first action, comprises outputting second data corresponding to the first data;
determining a file type associated with the first data;
responsive to the second action, performing, by the computer system, a comparison of contents of the first data to contents of the second data, wherein performing the comparison includes determining a difference in detected entropy levels of the first data and the second data exceeds an entropy threshold level for the determined file type, and wherein a first entropy threshold level for a first file type is different than a second entropy threshold level for a second file type;
determining an average frequency of performance of an opcode in non-encrypting processes that have been executed on the computer system, wherein exceeding a threshold frequency of performance of the opcode above the average frequency of performance of the opcode is associated with an encryption operation;
determining that a frequency of performance of the opcode performed by the process exceeds the threshold frequency of performance of the opcode above the average frequency of performance of the opcode;
based on results of the comparison and the determining that the frequency of performance of the opcode performed by the process exceeds the threshold frequency of performance of the opcode above the average frequency of performance of the opcode, determining that the process is performing the encryption operation; and
creating, by the computer system, a user notification regarding encryption activity of the process.

2. The method of claim 1, wherein performing the comparison further includes determining that the first data corresponds to a first file format and the second data does not correspond to a list of one or more file formats including the first file format.

3. The method of claim 1, further comprising:
in response to determining that a text-based file format associated with the first data has not been changed in the second data to a non-text based file format, analyzing a frequency of letters in the second data to determine if a substitution cipher has been used to encrypt the first data.

4. The method of claim 1, wherein performing the comparison further comprises performing a fuzzy hashing analysis between the first data and the second data, and wherein performing the fuzzy hashing analysis comprises analyzing a first plurality of data portions of the first data relative to a second corresponding plurality of data portions of the second data to determine an amount of change between the first and second data.

5. The method of claim 4, further comprising based on the amount of change, performing an entropy analysis on a first particular one of the first plurality of data portions of the first data and a corresponding second particular one of the second plurality of data portions of the second data to determine if an encryption operation has been performed on the first particular data portion.

6. The method of claim 1, wherein the monitoring further includes identifying that the process is exceeding a threshold level of storage access.

7. The method of claim 1, wherein the monitoring further includes identifying that the process as not on a process whitelist.

8. The method of claim 1, wherein the process has not yet completed the encryption operation at a time that, based on results of the comparison, it is determined that the process is performing an encryption operation.

9. A non-transitory machine-readable medium having stored thereon instructions executable to cause a machine to perform operations comprising:
determining that a process executing on a computer system is to be monitored based on monitoring criteria including at least that the process exceeds a threshold level of processor usage;
detecting that a first action performed by the process corresponds to reading first data from a location accessible to the computer system, and that a second action, performed by the process subsequent to the first action, comprises outputting second data that corresponds to the first data;
determining a file type associated with the first data;
responsive to the second action, performing an analysis of contents of the second data, wherein performing the analysis includes determining a difference in detected entropy levels of the first data and the second data exceeds an entropy threshold level for the determined file type, and wherein a first entropy threshold level for a first file type is different than a second entropy threshold level for a second file type;
determining an average frequency of performance of an opcode in non-encrypting processes that have been executed on the computer system, wherein exceeding a threshold frequency of performance of the opcode above the average frequency of performance of the opcode is associated with an encryption operation;
determining that a frequency of performance of the opcode performed by the process exceeds the threshold frequency of performance of the opcode above the average frequency of performance of the opcode;
based on results of the analysis and the determining that the frequency of performance of the opcode performed by the process exceeds the threshold frequency of performance of the opcode above the average frequency of performance of the opcode, determining that the process is performing the encryption operation; and
responsive to the determination that the process is performing the encryption operation, performing a remedial action relative to the process.

10. The non-transitory machine-readable medium of claim 9, wherein determining that the process is performing the encryption operation is based on determining that the process is accessing a cryptography library.

11. The non-transitory machine-readable medium of claim 10, wherein determining that the process is accessing a cryptography library comprises detecting that the process is accessing at least one of:
a cryptographic function provided by an operating system of the computer system; or
a cryptographic function stored within the process; or
a cryptographic function stored within a particular file accessible to the computer system.

12. The non-transitory machine-readable medium of claim 9, wherein the operations further comprise comparing a hash value for the process to one or more process hash values associated with a process whitelist.

13. The non-transitory machine-readable medium of claim 9, wherein the outputting the second data comprises at least one of writing the second data to storage or causing transmission of the second data through a network interface device of the computer system.

14. The non-transitory machine-readable medium of claim 9, wherein performing the remedial action includes at least one of: transmitting an electronic message to a system administrator indicating that the process may be suspicious or logging behavior of the process.

15. The non-transitory machine-readable medium of claim 9, wherein the remedial action includes quarantining the process.

16. A system, comprising:
a non-transitory memory; and
one or more hardware processors coupled to the non-transitory memory and configured to execute instructions to cause the system to perform operations comprising:
determining, based on monitoring criteria, that a process executing on a computer system is to be monitored, wherein the monitoring criteria includes identifying that the process exceeds a threshold level of processor usage;
detecting that a first action performed by the process corresponds to reading first data from a location accessible to the computer system, and that a second action, performed by the process subsequent to the first action, is outputting second data that corresponds to the first data;
determining a file type associated with the first data;
responsive to the second action, performing an analysis of contents of the second data, wherein performing the analysis includes determining a difference in detected entropy levels of the first data and the second data exceeds an entropy threshold level for the determined file type, and wherein a first entropy threshold level for a first file type is different than a second entropy threshold level for a second file type;
determining an average frequency of performance of an opcode in non-encrypting processes that have been executed on the computer system, wherein exceeding a threshold frequency of performance of the opcode above the average frequency of performance of the opcode is associated with an encryption operation;

determining that a frequency of performance of the opcode performed by the process exceeds the threshold frequency of performance of the opcode above the average frequency of performance of the opcode;

based on results of the analysis and the determining that the frequency of performance of the opcode performed by the process exceeds the threshold frequency of performance of the opcode above the average frequency of performance of the opcode, determining that the process is performing the encryption operation; and performing a remedial action relative to the process.

17. The system of claim 16, wherein the monitoring criteria further includes identifying that the process exceeds a threshold level of storage access.

18. The system of claim 16, wherein determining that the process is performing the encryption operation is based on determining that the process is accessing a cryptography library.

* * * * *